United States Patent [19]

Jühling

[11] Patent Number: 4,648,635

[45] Date of Patent: Mar. 10, 1987

[54] BAYONET COUPLING FOR HOLLOW CYLINDRICAL MEMBERS

[75] Inventor: Dieter Jühling, Constance, Fed. Rep. of Germany

[73] Assignee: Sulzer Brothers Limited, Winterthur, Switzerland

[21] Appl. No.: 835,452

[22] Filed: Mar. 3, 1986

[30] Foreign Application Priority Data

Mar. 6, 1985 [CH] Switzerland ........................ 1007/85

[51] Int. Cl.[4] ............................................ F16L 19/00

[52] U.S. Cl. .................................. 285/361; 285/362; 285/377; 285/353; 285/396; 285/402

[58] Field of Search ............... 285/361, 362, 376, 377, 285/396, 402, 353, 375, 349

[56] References Cited

U.S. PATENT DOCUMENTS 1,885,321 11/1932 Benn .............................. 285/361 X
2,466,892 4/1949 Holmes .......................... 285/376 X

FOREIGN PATENT DOCUMENTS 10638 of 1910 United Kingdom ................ 285/362
507518 6/1939 United Kingdom ................ 285/362

*Primary Examiner*—Richard J. Scanlan, Jr.
*Attorney, Agent, or Firm*—Kenyon & Kenyon

[57] ABSTRACT

The bayonet coupling is provided with a connecting ring having radial pins for engaging in grooves in a hollow member to provide a loose connection. In addition, a screw-threaded ring is threaded into the connecting ring to move against a shoulder on one hollow member in order to compress a resilient seal ring between the hollow members and thus provide a strong seal-tight connection.

6 Claims, 1 Drawing Figure

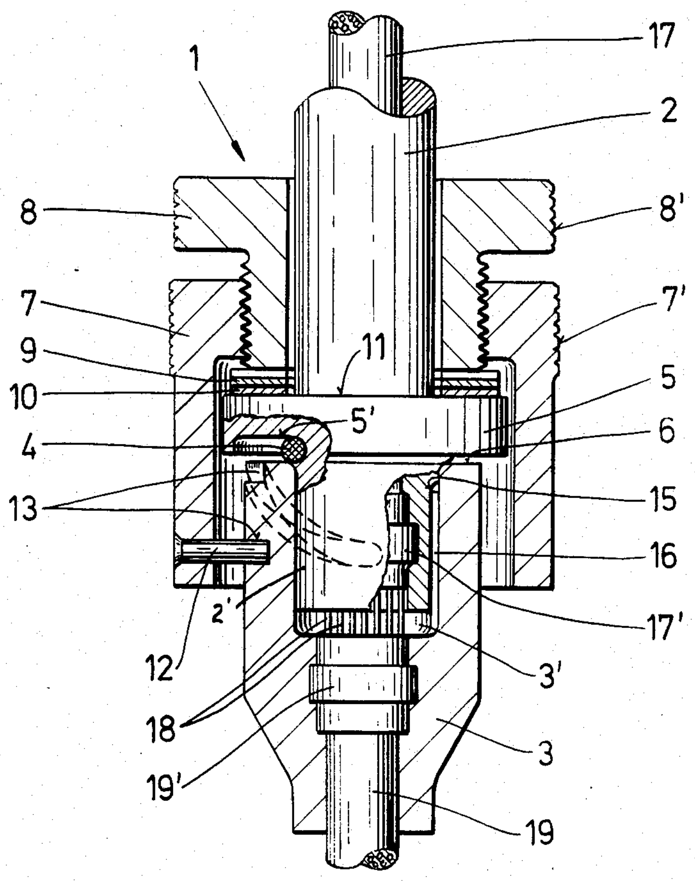
1
2
3
3'
4
5
5'
6
7
7'
8
8'
9
10
11
12
13
15
16
17
17'
18
19
19'
2'

BAYONET COUPLING FOR HOLLOW CYLINDRICAL MEMBERS

This invention relates to a bayonet coupling for hollow cylindrical members. More particularly, this invention relates to a bayonet coupling for the hollow cylindrical members of an electrical plug.

As is known, bayonet couplings have been used in various environments in order to enable a seal-type connection between two hollow cylindrical members to be made and released rapidly. This is an important characteristic, for example, for the connection of power and control cables to pressurized valves and their drives since cables of this kind must be released and sealingly connected frequently in servicing and inspection work.

In some cases, one hollow member is provided with an axial extension which can be received in a corresponding axial recess in the other member while a ring seal provided between opposite end faces of the two members. In addition, this bayonet coupling is provided with a rotatable connecting ring which engages on a shoulder of one member and, via projections, engages in shaped grooves in the other member. By turning of the ring a bayonet connection can be made between the two members. However, because of the unavoidable clearance between the coupling members, which clearance increases with wear, the ring seal is uneveningly loaded at the periphery. This, in turn, may lead to premature wear of the ring seal so that for safety's sake, frequent seal replacement becomes necessary along with increased maintanance and operating costs.

Accordingly, it is an object of the invention to even out the loading of the seal ring in a bayonet coupling between two hollow cylindrical members.

It is another object of the invention to reduce the frequency of seal changes and costs incurred thereby in couplings between hollow cylindrical members.

It is another object of the invention to provide a coupling of simple economical construction for use in coupling hollow cylindrical members together.

Briefly, the invention provides a bayonet coupling for a pair of hollow cylindrical members wherein one member has an axial extension received in a corresponding axial recess in the other member and wherein a ring seal is disposed between the members with a shoulder provided on one of the members.

The bayonet coupling includes an axially movable and rotatable connecting ring which engages the shoulder on one side and which has a plurality of radially inwardly projecting elements cooperating with projections on the other of the hollow members in order to interconnect the two members. In addition, the coupling includes a clamping means which engages between the connecting ring and one of the members for moving the member having the shoulder towards the other member to compress the ring seal.

The bayonet coupling enables the two hollow cylindrical members to be interconnected sealingly in two steps. In a first step, after the two members have been pushed together, a loose connection is made by turning the connecting ring. This possibly results in only minor stressing of the resilient seal. In a following second step, the clamping means is actuated to move the hollow members further together while compressing the ring seal. This results in a strong pressure-tight connection while the ring seal is uniformly stressed only by axial forces. In like manner, the coupling is released in two steps which are carried out in reverse sequence.

The stepwise procedure for coupling and uncoupling reduces the stressing of the ring seal since the ring seal experiences rotating forces only when the connection is made or released in the loose state.

The clamping means which enables the ring seal to be stressed relatively heavily provides further safety enhancing advantages. For example, the clamping means provides an improved seal near the resilient ring seal. Further, the clamping means provides a stronger connection due to an increased pressure of engagement between the two hollow cylindrical members. Still further, an increased braking action is provided on the connecting ring so that the connecting ring can be turned readily only when the clamping means has been released. This latter feature turns the coupling into a safety coupling with accidental opening of the coupling being virtually impossible if the coupling components are designed appropriately.

Since the connecting ring can be turned readily with the clamping means released and little force is required to operate the clamping means, manipulation of the bayonet coupling takes approximately the same time as for a conventional bayonet coupling. However, the connecting ring of the conventional coupling requires considerable force to turn the connecting ring.

These and other objects and advantages of the invention will become more apparent from the following detailed description taken in conjunction with the accompanying drawing wherein:

The FIGURE illustrates a cross sectional view of a bayonet coupling constructed in accordance with the invention.

Referring to the drawing, the bayonet coupling 1 has a pair of hollow cylindrical members 2, 3 which are disposed coaxially of one another with one member 2 engaging by way of an axial extension 2' in a corresponding axial recess 3' in the other member 3. In addition, a resilient ring seal 4, in the form of an O-ring, is disposed between the two opposite end faces 5', 6, respectively of the members 2, 3. As indicated, the O-ring 4 extends around the axial extension 2' and is received in an annular groove disposed at the transition from the extension 2' to a flange-like shoulder 5 of the hollow member 2.

A connecting ring 7 extends over the shoulder 5 and bridges that region of the hollow member 3 which is near the shoulder 5. At the end near the hollow member 3, the ring 7 has three radially inwardly projecting elements 12 in the form of riveted pins which cooperate with projections on the lower member 3, as viewed, in order to interconnect the members 2, 3. As illustrated, each projection on the hollow member 3 is formed by the upper wall of a helical groove 13 which receives a projecting element 12. Each groove 13 extends at a right angle to the longitudinal axis of the hollow member 3. Further, each groove 13 extends approximately over one-third of the periphery of the hollow member 3.

The closed end of each groove 13 extends for a short distance so that a respective pin 12 can take up a latching or caught position at the closed end of the groove 13.

A clamping means in the form of a screwthreaded ring 8 is threaded by way of an external screwthread into an internal screwthread of the connecting ring 7 and is located above the shoulder 5 between the upper hollow member 2 and the ring 7. The ring, 8 has an end face which bears by way of an annular spring 9 which is in the form of a wavy resilient sheet metal member, and a washer or shim 10, on a shoulder surface 11 of the shoulder 5 which is remote from the lower hollow member 3. The ring 8 thus engages between the connecting ring 7 and the upper member 2 for moving the member 2 towards the lower member 3 in order to compress the ring seal 5.

In order to facilitate turning of the rings 7, 8 by hand, both rings have a knurling 7′, 8′, respectively, on the outer periphery.

In order to prevent the members 2, 3 from turning relative each other, the axial extension 2′ of the upper member 2 is formed with a narrow longitudinal groove 15 which is adapted to cooperate with a rib 16 in the recess 3′ of the lower member 3.

A cable 17 comprising signal lines is disposed in the upper member 2 and is connected to a plug half 17′ which is sealingly secured inside the upper member 2 and which is made of plastics. Correspondingly, a cable 19 comprising signal lines and a second plug half 19′ is disposed in the lower hollow member 3. As indicated, plug pins 18 are disposed between the halfs 17′, 19′. Consequently, when the axial extension 2′ of the upper member 2 is pushed in, the two halfs of the plug 17′, 19′ are electrically interconnected.

In order to connect the coupling 1, the axial extension 2′ is engaged in the recess 3′ in the lower member 3. At this time, the rib 16 serves to align with the groove 15 so that incorrect contacting between the two plug halfs 17′, 19′ is precluded. The connecting ring 7 is then pressed lightly against the lower member 3 and turned until the pins 12 engage in the respective helical grooves 13 and catch at the closed ends thereof. The screwthreaded clamping ring 8 must be so adjusted in this catch or latched position so as to press the spring 9 only lightly onto the washer 10 so that the resilient ring 4 experiences little stressing when the connecting ring 7 is turned. The first step of the coupling operation has therefore been performed and the two members 2, 3 are loosely interconnected.

Next, the clamping ring 8 is turned by hand until the ring 8 is pressed strongly on the spring 9 and, by way of the washer 10 and shoulder 5, further compresses the resilient ring 4. When the clamping ring 8 is turned, the resilient ring 4 is loaded only axially and uniformly over its periphery. Even in this loaded or stressed state, the spring 9 protects the resilient ring 4 from overstressing by non-axial forces acting on the coupling 1.

The coupling 1 is now in a state of tight connection. In order to release the coupling 1, the above steps are performed in a reverse sequence.

When the coupling is in the tightly connected state, the relatively substantial axial loading on the flanks of the screwthreads of the rings 7, 8, on the shoulder surface 11 and on the contact surface between the pins 12 and the grooves 13 creates substantial braking action so that it is virtually impossible to turn the ring 7 accidentally. The clamping ring 8 must first be released before the connecting ring 7 can be released.

In the embodiment described, those wall parts of the lower member 3 which are left between the grooves 13 function as projections which cooperate with the radially projecting pins 12. However, the pins 12 and the projections can be arranged to initially move only axially towards one another when the loose connection is being made. In this case, the projections and the projecting pins would move past one another and only then is the connecting ring 7 turned so that the pins take up a position behind the projections as viewed axially of the coupling. The ring seal 4 can be virtually unstressed in this state of loose connection. In the second and subsequent coupling step, the ring seal is compressed by means of the screwthreaded ring 8.

Instead of being disposed between the end faces 5′, 6 of the hollow members, the ring seal 4 can be disposed between the two halfs 17′, 19′ of the plug. In this case, the diameter of the shoulder 5 can be reduced.

Instead of using a screwthreaded ring 8 as the clamping means, a lever system known for snap fastenings can be used as the clamping means. Further, instead of being disposed between the connecting ring 7 and the upper member 2, the clamping means can function between connecting ring 7 and the lower member 3.

The invention thus provides a relatively simple bayonet coupling for coupling hollow members together in a relatively rapid manner without imposing undue stresses on a resilient seal ring between the members.

Further, the invention provides a bayonet coupling which is able to impose an increased pressure of engagement between two hollow cylindrical members.

What is claimed is:

1. A bayonet coupling comprising
   - a pair of hollow cylindrical members, one of said members having an axial extension received in a corresponding axial recess in the other of said members, said other member having helical grooves in a periphery thereof, each said groove having a closed end extending at a right angle to a longitudinal axis of said other member;
   - a ring seal between said members;
   - a shoulder on one of said members;
   - an axially movable and rotatable connecting ring engaging said shoulder and having a plurality of radially inwardly projecting elements cooperating with said helical grooves in the other of said members to interconnect said members; and
   - clamping means engaging between said connecting ring and one of said members for moving said members having said shoulder towards said other member to compress said ring seal.

2. A bayonet connection as set forth in claim 1 wherein said clamping means engages between said connecting ring and said member having said shoulder.

3. A bayonet connection as set forth in claim 2 wherein said clamping means includes a screwthreaded ring threaded into said connecting ring and bearing against said shoulder.

4. A bayonet connection as set forth in claim 3 which further comprises a spring between said shoulder and said screwthreaded ring.

5. A bayonet coupling for an electrical plug comprising
   - a pair of hollow cylindrical members, one of said members having an axial extension received in a corresponding axial recess in the other of said members;
   - a ring seal between said members;
   - a shoulder on one of said members;
   - a plurality of helical grooves in the other of said members;
   - a connecting ring bridging over said shoulder at one end and having a plurality of inwardly projecting elements at an opposite end slidably received in said grooves to interconnect said members upon rotation of said ring; and a rotatable clamping ring threadably engaged in said connecting ring and engaging said shoulder for moving said one member towards said other member to compress said ring seal.

6. A bayonet coupling as set forth in claim 5 which further comprises a spring between said clamping ring and said shoulder.

* * * * *